(12) United States Patent
Merkin et al.

(10) Patent No.: US 7,814,349 B2
(45) Date of Patent: *Oct. 12, 2010

(54) MAINTAINING SERVER PERFORMANCE IN A POWER CONSTRAINED ENVIRONMENT

(75) Inventors: Aaron Eliahu Merkin, Holly Springs, NC (US); William Bradley Schwartz, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 522 days.

This patent is subject to a terminal disclaimer.

(21) Appl. No.: 11/760,888

(22) Filed: Jun. 11, 2007

(65) Prior Publication Data

US 2007/0234090 A1 Oct. 4, 2007

Related U.S. Application Data

(63) Continuation of application No. 10/875,253, filed on Jun. 24, 2004, now Pat. No. 7,281,145.

(51) Int. Cl.
*G06F 1/00* (2006.01)
*G06F 1/26* (2006.01)

(52) U.S. Cl. .................... 713/300; 713/320; 713/340

(58) Field of Classification Search ............... 713/300, 713/320, 340; 709/102; 705/22, 28
See application file for complete search history.

(56) References Cited

U.S. PATENT DOCUMENTS

| | | | |
|---|---|---|---|
| 5,586,332 A | 12/1996 | Jain et al. | |
| 5,765,003 A | 6/1998 | MacDonald et al. | |
| 6,047,248 A | 4/2000 | Georgiou et al. | |
| 6,158,012 A | 12/2000 | Watts, Jr. | |
| 6,535,798 B1 | 3/2003 | Bhatia et al. | |
| 6,587,950 B1 | 7/2003 | Shah et al. | |
| 6,711,691 B1 * | 3/2004 | Howard et al. | 713/300 |
| 6,757,897 B1 * | 6/2004 | Shi et al. | 718/102 |
| 7,219,249 B1 * | 5/2007 | Ghose et al. | 713/324 |
| 7,272,732 B2 * | 9/2007 | Farkas et al. | 713/320 |
| 7,281,145 B2 * | 10/2007 | Merkin et al. | 713/320 |

(Continued)

OTHER PUBLICATIONS

Biran, et al.; Automated Power Control Policies Based on Application-Specific Redundancy Characteristics.

(Continued)

*Primary Examiner*—Vincent T Tran
(74) *Attorney, Agent, or Firm*—H. Barrett Spraggins; Cynthia G. Seal; Biggers & Ohanian, LLP.

(57) ABSTRACT

A method of managing resources in a data processing configuration includes allocating system resources to an application to ensure a specified level of performance for the application. A system parameter is then modified to conserve power consumption upon detecting a condition resulting in a reduction of available system power. The original system resource allocation is then modified to maintain the specified level of performance following the modification of the system parameter. The system resources may include system CPU cycles and allocating system resources may include allocating a specified percentage of the CPU cycles to a high priority application. The reduction of available system power may be caused by an excessive ambient temperature or the failure of a power supply. Modifying the system parameter to conserve power consumption includes throttling the CPU speed and then dynamically increasing the percentage of CPU cycles allocated to the high priority application.

9 Claims, 5 Drawing Sheets

U.S. PATENT DOCUMENTS

| | | | |
|---|---|---|---|
| 7,461,272 B2 * | 12/2008 | Rotem et al. | 713/300 |
| 2002/0194509 A1 | 12/2002 | Plante et al. | |
| 2003/0033364 A1 | 2/2003 | Garnett et al. | |
| 2003/0037150 A1 | 2/2003 | Nakagawa | |
| 2003/0065497 A1 | 4/2003 | Rhoads | |
| 2003/0084154 A1 | 5/2003 | Bohrer et al. | |
| 2003/0088605 A1 * | 5/2003 | Beghtel et al. | 709/102 |
| 2004/0003309 A1 * | 1/2004 | Cai et al. | 713/320 |
| 2004/0025063 A1 | 2/2004 | Riley | |
| 2004/0030941 A1 | 2/2004 | Barr et al. | |
| 2004/0124703 A1 * | 7/2004 | Tani et al. | 307/10.1 |
| 2004/0167732 A1 * | 8/2004 | Spitaels et al. | 702/62 |
| 2005/0034000 A1 | 2/2005 | Lee | |
| 2005/0075937 A1 * | 4/2005 | Bresniker et al. | 705/22 |
| 2005/0076251 A1 * | 4/2005 | Barr et al. | 713/300 |
| 2005/0141554 A1 * | 6/2005 | Hammarlund et al. | 370/468 |
| 2007/0300083 A1 * | 12/2007 | Goodrum et al. | 713/300 |

OTHER PUBLICATIONS

Bose, et al.; Processor with Demand-Driven Clock Throttling Power Reduction.

Dubinsky; Power Management System.

Elnozahy, et al.; Energy-Inducted Process Migration.

Franke, et al.; BC+ Apparatus, Method and Program Product for Automatically Distributing Power to Modules within a Server.

* cited by examiner

US 7,814,349 B2

MAINTAINING SERVER PERFORMANCE IN A POWER CONSTRAINED ENVIRONMENT

CROSS-REFERENCE TO RELATED APPLICATION

This application is a continuation application of and claims priority from U.S. patent application Ser. No. 10/875,253, filed on Jun. 24, 2004 now U.S. Pat. No. 7,281,145.

BACKGROUND

1. Field of the Present Invention

The present invention is in the field of data processing systems and, more particularly, data processing systems that employ CPU throttling.

2. History of Related Art

In the field of data processing systems and, more specifically, server systems, resource management software allows administrators to allocate CPU time to specific applications running under the server's operating system. The resource management software can allocate CPU cycles to applications such that, for example, high priority applications can be guaranteed a minimum percentage of CPU cycles. This type of resource management beneficially enables administrators to permit low priority applications to execute without substantially degrading the performance of high priority applications.

Typically, resource management software has been applied in the context of a static performance environment. More specifically, resource allocations made by resource management software assume that the CPU speed is a fixed parameter. The assumption of a constant clock speed, however, is no longer universally accurate. In an effort to address power consumption issues, techniques for modifying the CPU clock speed have emerged. CPU's that execute at slower clock speeds consume less power than comparable CPU's running at higher clock speeds. When a CPU's clock speed is reduced in an effort to conserve power, performance guarantees based on allocating CPU cycles to high priority applications may require adjustment. Unfortunately, conventional implementations of system manager resources do not account for the potential affect that CPU throttling may have on performance guarantees (also referred to herein as service level agreements or SLA's). It would be desirable to implement system management resources that dynamically adjust the factors required to honor performance guarantees when system conditions, such as available power, change.

SUMMARY OF THE INVENTION

The identified objective is addressed according to the present invention by a method of managing resources in a data processing configuration. Initially, resources are allocated to an application to ensure a specified level of performance for the application. A system parameter is then modified to conserve power consumption upon detecting a condition resulting in a reduction of available system power. The original system resource allocation is then modified to maintain the specified level of performance following the modification of the system parameter. The system resources may include system CPU cycles and allocating system resources may include allocating a specified percentage of the CPU cycles to a high priority application. The reduction of available system power may be caused by an excessive ambient temperature or the failure of a power supply. Modifying the system parameter to conserve power consumption includes throttling the CPU speed and then dynamically increasing the percentage of CPU cycles allocated to the high priority application.

BRIEF DESCRIPTION OF THE DRAWINGS

Other objects and advantages of the invention will become apparent upon reading the following detailed description and upon reference to the accompanying drawings in which.

Figure 1:
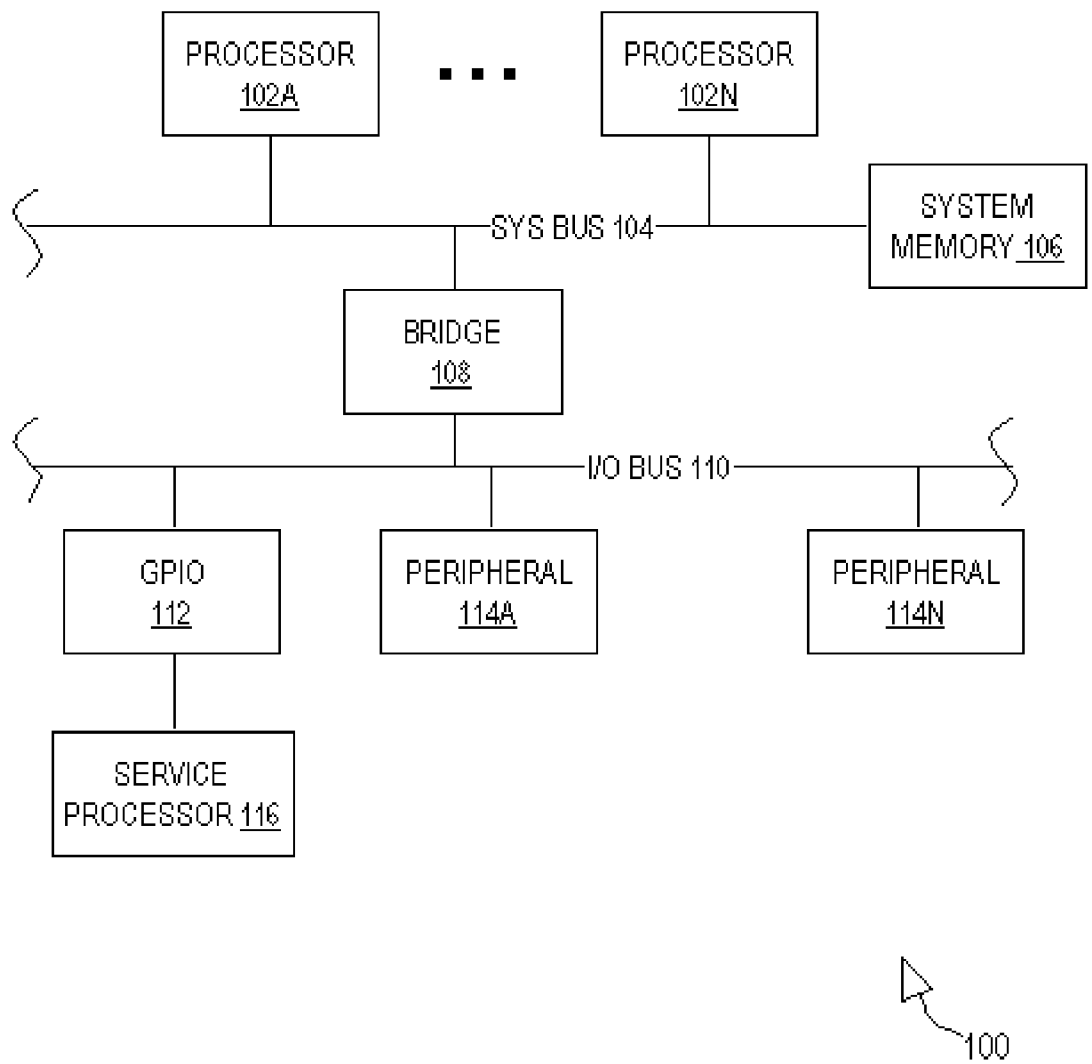
FIG. 1 is a block diagram of selected elements of a data processing system suitable for use with one embodiment of the present invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Before describing specific features of a network or server that includes the dynamic resource allocation features of the present invention, selected elements of a data processing system suitable for use in implementing the network or server are described. Turning to the drawings, FIG. 1 illustrates selected features of a data processing system 100 suitable for use in a data processing network or server according to one embodiment of the invention. Data processing system 100 may be implemented entirely upon a single printed circuit board or "blade." Thus, data processing system 100 may be referred to herein as server blade 100. In the depicted embodiment, server blade 100 includes a set of main processors 102A through 102N (generically or collectively referred to as processor(s) 102) that are connected to a system bus 104. A common system memory 106 is accessible to each processor 102 via system bus 104. The system memory is typically implemented with a volatile storage medium such as an array of dynamic random access memory (DRAM) devices. The depicted architecture of server blade 100 is frequently referred to as a symmetric multiprocessor (SMP) system because each processor 102 has substantially equal access to system memory 106.

In server blade 100, a bus bridge 108 provides an interface between system bus 104 and an I/O bus 110 to which one or more peripheral devices 114A through 114N (generically or collectively referred to as peripheral device(s) 114) as well as a general purpose I/O (GPIO) port 112 are connected. Peripheral devices 114 may include devices such as a graphics adapter, a high-speed network adapter or network interface card (NIC), a hard-disk controller, and the like. I/O bus 110 is typically compliant with one of several industry standard I/O bus specifications including, as a common example, the Peripheral Components Interface (PCI) bus as specified in

*PCI Local Bus Specification Rev* 2.2 by the PCI Special Interest Group (www.pcisig.com).

The depicted embodiment of server blade 100 includes a service processor 116 connected to GPIO port 112. Service processor 116 is configured to provide support for main processors 102. This support may include, for example, monitoring the power supplied to main processor(s) 102 and, in the event of a blade crash, initiating a restart of the main processors.

Figure 2A:
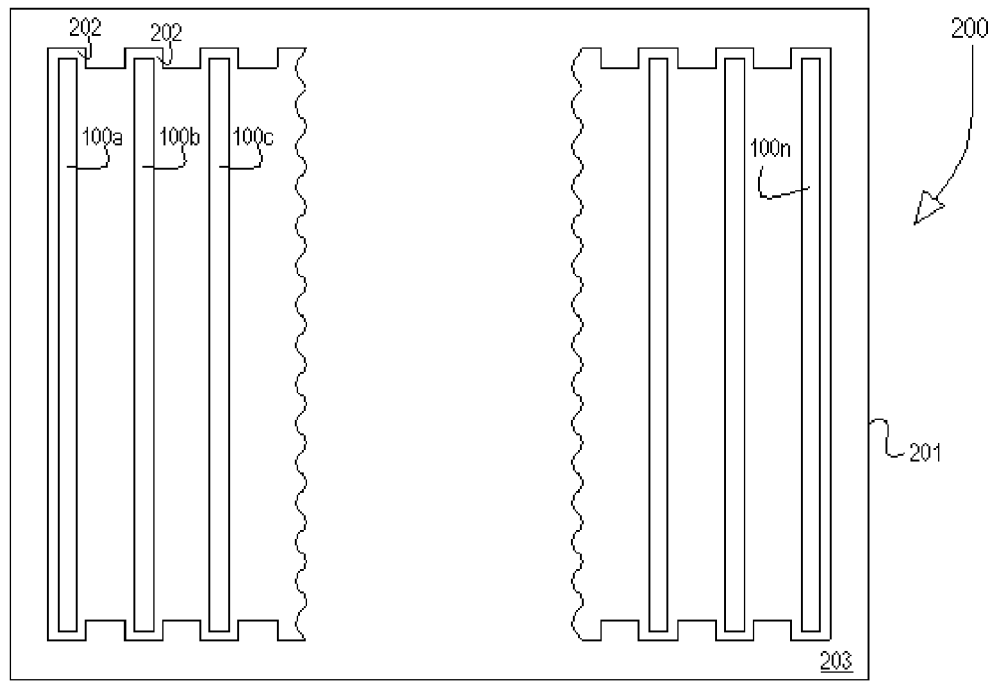
FIG. 2A is a front view of a data processing configuration according to one embodiment of the invention.
Figure 2B:
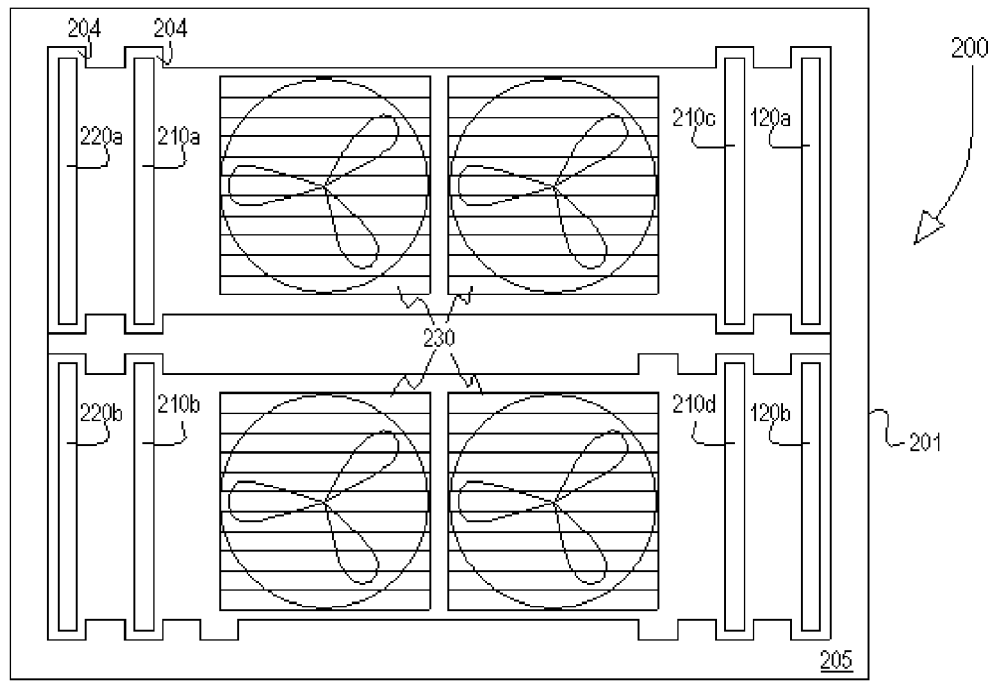
FIG. 2B is a rear view of the data processing configuration depicted in FIG. 2A.

Turning now to FIGS. 2A and 2B, front and rear views respectively of an embodiment of a data processing network or server (generically referred to herein as a data processing configuration) 200 are illustrated. As shown in the front view of FIG. 2A, data processing configuration 200 includes a cabinet (or chassis) 201 having a plurality of slots 202 in its front face 203. Each slot 202 is configured to receive a printed circuit board-based system such as a server blade 100. (The set of server blades depicted in FIG. 2 are identified by reference numerals 100a through 100n). Each server blade 100 is plugged into an interconnection (not depicted) referred to herein as the mid-plane because of its intermediate location between server blades 100 and other adapters or blades that are plugged into the opposite side of the mid-plane from the rear face of cabinet 201 (see FIG. 2B). In this embodiment, the interconnected server blades 100 in configuration 200 are suitable for implementing a local area network (LAN) such as an Ethernet LAN in which each blade 100 has its own IP address and Media Access Control (MAC) address. Configuration 200 may itself be connected to an external network such as the Internet through a gateway (not depicted) or other suitable network device.

The number of server blades within cabinet 201 varies with the implementation. In a representative configuration, the front face 203 of cabinet 201 includes 14 or more slots 202 for receiving server blades 100. Each server blade 100 is typically a full-height adapter.

The rear view of data processing configuration 200 depicted in FIG. 2B illustrates additional selected elements of the configuration. More specifically, the rear face 205 of cabinet 201 includes a set of half-height slots 204. Various half-height modules or blades are plugged into the previously mentioned mid-plane via slots 204 in rear face 205. In the depicted embodiment, these modules include a set of network interconnect modules identified by reference numerals 210a, 210b, 210c, and 210d, a pair of power supply modules 220a and 220b, and first and second system management modules 120a and 120b (generically or collectively referred to as management module(s) 120). Also shown are a set of cabinet cooling fans 230. It will be appreciated that the number of network interface modules 210, power supply modules 220, and cabinet cooling fans 230 is implementation specific. Network interface modules 210 provide connectivity between the server blades 100 and an external network such as the Internet. In one embodiment, each server blade 100 is configured with four independent network connection paths via the four separate modules 210a through 210d. The power supply modules 220a and 220b provide configuration 200 with the required voltage levels.

Generally speaking, each management module 120 is configured to monitor and control resources and characteristics of elements of data processing configuration 200 that are shared by each server blade 100. These resources and characteristics may include, for example, the available power, cabinet cooling fans, and environmental characteristics such as the ambient temperature within cabinet 201. Although multiple and potentially redundant management modules 120 are depicted, other implementations may include just a single management module.

Portions of the present invention may be implemented as a sequence of processor executable instructions (software) for dynamically allocating system resources to maintain service level agreements in the face of altered system resources where the instructions are stored on a computer readable medium. During execution, portions of the software may reside in a volatile storage element such as the system memory 106 associated with processors 102. At other times, portions of the software may be stored on a non-volatile storage medium such as a floppy diskette, hard disk, CD ROM, DVD, magnetic tape, or other suitable storage medium. In addition, portions of the software may be executed by management module 120 while other portions are executed by service processors 116 of each server blade 100.

Figure 5:
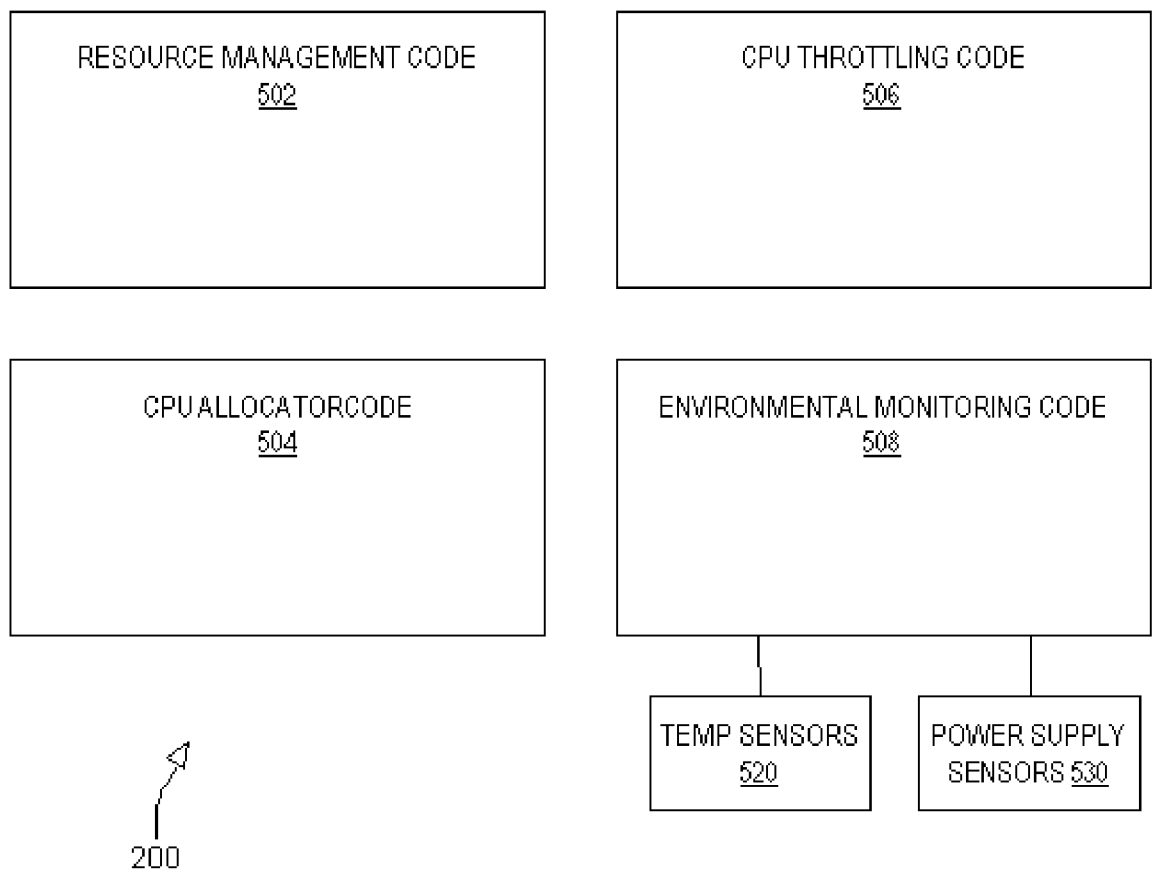
FIG. 5 is a conceptual representation of selected software elements of an embodiment of the present invention.

Referring to FIG. 5, software elements of an embodiment of the present invention are depicted. In the depicted embodiment, data processing configuration 200 includes resource management code 502, a resource allocator code module 504, a CPU throttling code module 506, and a code module 508 for monitoring system environment parameters including ambient temperature and power supply status. Resource allocator code module 504 enables an administrator to dedicate portions of system resources on a per-application basis. In one embodiment particularly germane to the present invention, resource allocator code module 504 permits the administrator to implement service level agreements by guaranteeing a specifiable percentage of total CPU cycles on a per-application basis.

CPU throttling code module 506, as its name implies, enables CPU throttling on data processing configuration 200. CPU throttling refers to deliberately changing the operating frequency of a system's CPU's, typically in an effort to conserve power consumption. Under appropriate stimulus, CPU throttling code module 506 executes commands that effect a modification of the basic clock speed at which the CPU's of data processing configuration 200 are operating. In the most likely implementation, the CPU's of data processing configuration 200 are capable of operating at two or more discreet clock frequencies. CPU throttling code communicates with operating system code and low level code (such as system BIOS) to modify the operating frequency (clock speed) of the CPU's.

In the implementation depicted in FIG. 5, CPU throttling code module 506 communicates with environmental monitoring code module 508. Environmental monitoring code module 508 receives inputs from environmental sensors such as temperature sensors 520 and power supply sensors 530. The power supply sensors 530 provide information about the status of the power modules 220 (FIG. 2B) of data processing configuration 200 while temperature sensors monitor ambient temperature and possible the temperature of critical components such as the CPU's.

If environmental monitoring code module 508 receives a sensor input indicating a condition that reflects or requires a reduction in the power available to data processing configuration 200, environmental monitor code 508 transmits a message to CPU throttling code module 506. CPU throttling code module, in turn, invokes code to slow down the CPU's of data processing configuration 200.

Resource allocation code module 504 communicates with CPU throttling code module 506. In response to detecting a throttling or other modification of the CPU speed by CPU throttling code module 506, resource allocation code module 504 is configured to evaluate the determine, based on the new CPU speed, how best to allocate the CPU cycles to maintain and honor any service level agreements that are in place. Typically, a reduction in CPU speed requires an increase in the amount of CPU cycles guaranteed to a particular application if the performance level is to be maintained.

In addition to being enabled to recognize a decrease in available system power, data processing configuration 200 and code modules 504 and 506 are preferably configured to recognize conditions that enable an increase in available system power. Under such conditions, CPU throttling code 506 may increase the speed of the CPU's and resource allocation code module 504 can respond by reducing the percentage of CPU cycles allocated to high priority applications, thereby potentially improving the performance of lower priority applications (without adversely impacting the performance level of the high priority applications).

Figure 3:
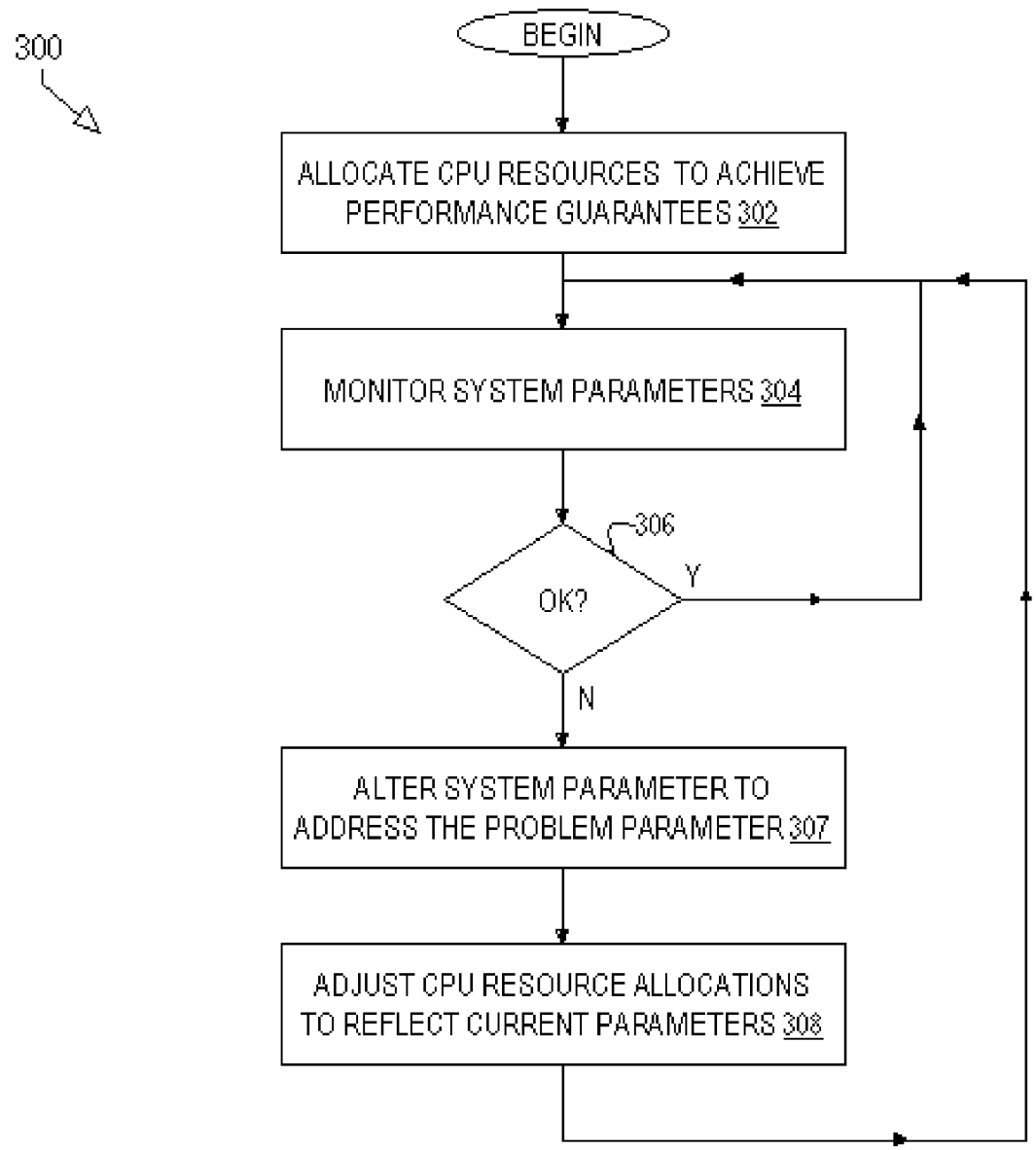
FIG. 3 is a flow diagram of a method of adjusting system resources according to an embodiment of the invention.

Turning now to FIG. 3, a flow diagram of a method 300 of allocating resources within a system such as data processing configuration 200 is presented. As depicted in FIG. 3, method 300 is initiated when system resources such as the CPU resources within data processing configuration 200 are allocated (block 302). In accordance with one application of the present invention, the allocation of system resources in block 302 includes invoking resource management code, most likely implemented in a management module 120 of data processing configuration 200 operating in conjunction with agents installed on each server blade 100, to allocate or reserve CPU cycles to at least some applications executing on data processing configuration 200. More specifically, allocation of CPU cycles according to one application of the invention, includes supporting a server level agreement by assigning a specified percentage of total CPU cycles to at least one high priority application.

After allocating system resources as desired, execution of one or more of the application programs proceeds and one or more system parameters are monitored (block 304). The system parameters being monitored refer to parameters that may have an impact on the ability of the system to maintain the CPU speed at the speed required to support any service level agreements represented by the resource allocations that were made in block 302. These monitored parameters include global, environmental parameters such as the amount of power available and the operating temperature of the data processing configuration 200.

If the monitored parameters are within a specified threshold (as determined in block 306), monitoring continues. If the monitored parameters are no longer within specified limits, a secondary system parameter is modified (block 307) to address the problem noted with the primary parameter. If, for example, the monitored parameter is indicative of the available system power, the secondary parameter modified in block 307 may include the operating speed of the CPU's.

In block 308, the resource allocations made in block 302 are adjusted dynamically in response to the modification of the secondary parameter. Preferably, the resource allocations, after adjustment, are sufficient to maintain all existing service level agreements. When the resource adjusted in block 307 is, for example, achieved by decreasing the speed of the CPU's, the allocation adjustment of block 308 likely includes increasing the allocation guarantees of high priority applications such that high priority applications do not suffer a performance drop-off at the new CPU speed.

Figure 4:
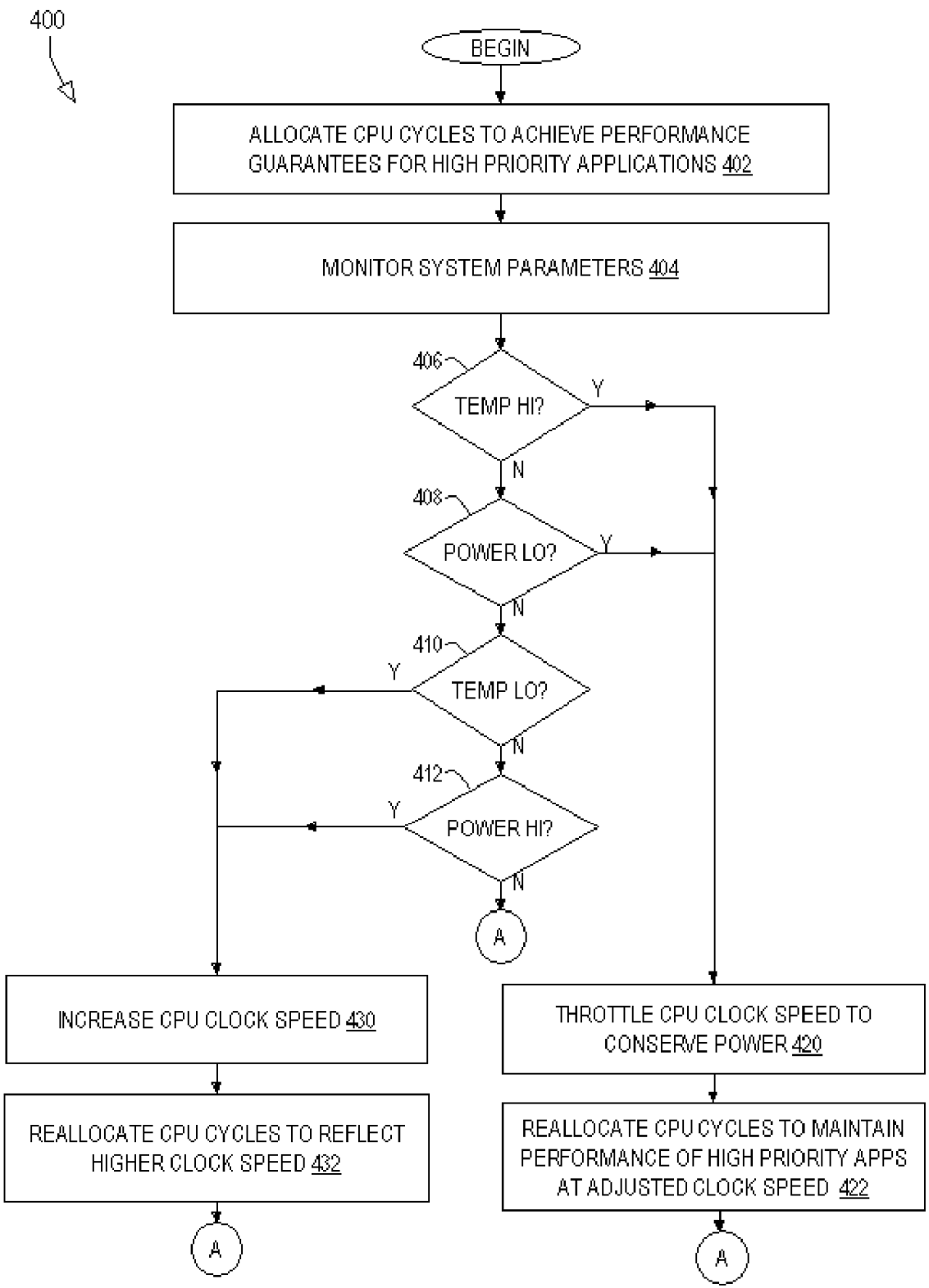
FIG. 4 is a flow diagram showing additional detail of one implementation of the method of FIG. 3.

Referring now to FIG. 4, a flow diagram illustrates additional detail of an implementation of the method 300 depicted in the flow chart of FIG. 3. In the implementation depicted in FIG. 4, a method 400 includes the allocation (block 402) of CPU cycles to achieve performance guarantees or honor service level agreements for a selected set of high priority applications, of which there may be one or more. After establishing the CPU allocations required to support the service level agreements under the initial conditions of the system, the system parameters are monitored (block 404), most likely by the resource management code or other code executing on the management module(s) 120 of FIG. 2.

The resources monitored in block 404 include the power supply status and the ambient temperature. Management module 120 monitors status of each power supply module 220 in data processing configuration 200. Using information that may be stored in a special purpose, non-volatile storage element, referred to as vital product data (VPD), management modules 120 can determine the aggregate amount of power available in each power domain. A power domain refers to the resources that receive power from a common power module 120.

If, in block 406, the monitored temperature is determined to exceed a specified threshold or, in block 408, the amount of power available is less than a specified threshold, such as when a power supply fails, corrective action is taken. Specifically, the CPU speed is reduced or throttled (block 420) either to accommodate the lower level of available power or to reduce the power consumption in an effort to reduce the operating temperature. Management modules 120 may determine the maximum CPU speed that can be accommodated at the available level or power. To make this determination, the management modules access information that correlates available power and CPU speed. This power/speed information may be stored locally within the service processor 116 of each server blade 100. Alternatively, the power/speed information may be provided as a part of each server's VPD or in some other repository of CPU parameters.

When the resource management module determines that throttling is required to accommodate a reduction in available power, management module 120 may inform each service processor 116 of the new CPU speed. Service processors 116, in conjunction with server blade BIOS, will adjust the CPU speed accordingly. The management module 120 will then inform resource management code 502 (FIG. 5) that the blade CPU's have been throttled. Returning to FIG. 4, resource management module 502 will then dynamically reallocate (block 422) CPU cycles to maintain the performance of high priority applications. In the event that not all high priority applications can be accommodated at the lower CPU speeds, resource management code module 502 will notify the user, thereby perhaps prioritizing the correction of the underlying thermal or power supply problem.

When a failed power supply is replaced or a thermal problem has been resolved, the environmental monitoring code 508 of FIG. 5 will preferably detect that the monitored temperature has dropped below a specified threshold (block 410) or that the available power has increased (block 412). In either case, the implication is that data processing configuration 200 can accommodate more power consumption. Accordingly, CPU throttling code module 506 is invoked to increase (block 430) the CPU speed to a level appropriate for the amount of available power and the resource management code module 502 is invoked to re-allocate (block 432) the CPU cycles accordingly.

In the manner described above, the present invention beneficially reconciles the ability to allocate resources as needed on a per-application basis with throttling techniques that are typically invoked when power consumption is implicated. The invention extends the usefulness of resource allocation techniques by making the resource allocation functionality adjustable to environmental conditions of the server or system. Thus, it will be apparent to those skilled in the art having the benefit of this disclosure that the present invention contemplates a mechanism for dynamically allocating resources in the face of varying system parameters. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A method of managing resources in a data processing system, comprising:
    allocating system resources to applications executing on the resources to ensure a specified level of performance for at least some of the applications, including allocating a specified percentage of CPU cycles to a high priority application;
    modifying a system parameter responsive to a condition indicating an increase in available system power, including increasing a CPU speed; and
    modifying the allocation of system resources to maintain the specified level of performance responsive to modifying the system parameter, including decreasing the specified percentage of CPU cycles allocated to the high priority application responsive to increasing the CPU speed following the condition indicating the increase in available system power.

2. The method of claim 1, wherein the condition indicating an increase in the available system power includes a temperature sensor indicating a system temperature below a specified threshold.

3. The method of claim 1, wherein modifying the system parameter includes throttling the CPU speed.

4. A computer program product comprising a set of computer executable instructions, stored on a computer readable medium, for managing resources in a data processing system, comprising:
    code means for allocating system resources to applications executing on the resources to ensure a specified level of performance for at least some of the applications, including allocating a specified percentage of CPU cycles to a high priority application;
    code means for modifying a system parameter responsive to a condition indicating an increase in available system power, including increasing a CPU speed; and
    code means for modifying the allocation of system resources to maintain the specified level of performance responsive to modifying the system parameter, including decreasing the specified percentage of CPU cycles allocated to the high priority application responsive to increasing the CPU speed following the condition indicating the increase in available system power.

5. The computer program product of claim 4, wherein the condition indicating an increase in the available system power includes a temperature sensor indicating a system temperature below a specified threshold.

6. The computer program product of claim 4, wherein the code means for modifying the system parameter includes throttling the CPU speed.

7. A data processing system, comprising:
    means for allocating resources of the system to a specified application, wherein the allocation of resources to the application reflects an expected level of performance associated with the application, including allocating a specified percentage of CPU cycles to the specified application;
    means for detecting a system condition indicating an increase in available system power;
    means for modifying a system parameter in response to the system condition, wherein modification of the system parameter affects the ability of the system to maintain the expected level of performance, including increasing a clock speed of at least one processor of the system; and
    means for re-allocating the system resources after modifying the system parameter to achieve the expected level of performance, including decreasing the specified percentage of CPU cycles allocated to the specified application responsive to increasing the clock speed of at least one processor of the system following the condition indicating the increase in available system power.

8. The system of claim 7, wherein means for detecting a system condition problem comprises means for detecting a condition that increases the amount of power available to the system.

9. The system of claim 7, wherein the system includes a set of blade servers, a power module, and a management module, wherein the set of blade servers shares power supplied by the power module and wherein the management module participates in allocating resources, modifying the system parameter, and re-allocating the system resources.

* * * * *